April 23, 1968 S. J. JANSSEN 3,379,905
MAGNETOSTRICTIVE TRANSDUCER
Filed Dec. 30, 1965

United States Patent Office 3,379,905
Patented Apr. 23, 1968

3,379,905
MAGNETOSTRICTIVE TRANSDUCER
Sylvain Jean Janssen, Paris, France, assignor to Compagnie des Compteurs, Paris, France, a company of France
Filed Dec. 30, 1965, Ser. No. 517,536
Claims priority, application France, Jan. 13, 1965, 1,772
7 Claims. (Cl. 310—26)

The present invention has for its object a magnetostrictive transducer of great strength and high efficiency.

The known sonic or ultrasonic transducers have many disadvantages. It is known, for instance, that ferrite magnetostrictors are brittle. When unloaded and operated in tune with their natural frequency in open air, inner breakings are often caused. Further, magnetostrictive materials more powerful than ferrite are known but the efficiency thereof is generally low. This is the case of nickel and various usual alloys (Fe-Ni, Fe-Co, Al-Fe, for example). Transducers made of such materials heat up strongly due to eddy currents produced therein, hysteresis losses and internal frictions. This latter cause especially plays a very important part.

The present invention mainly has for its object to obviate the above-mentioned disadvantages.

This object is attained by an improved transducer construction which features a composite of both magnetostrictive material and non-magnetostrictive i.e. "inactive" material having few internal losses, and wherein of the total volume involved in the composite, the quantity of magnetostrictive material is relatively small in comparison with the low loss "inactive" material.

A more specific object of the invention is to provide an improved magnetostrictive transducer comprising a bundle of plates piled together whereby sonic or ultrasonic waves are generated by a magnetizing field propagated in the same plane as the piled plates, the said bundle of plates further comprising alternately disposed thin plates of a magnetostrictive material and thicker plates of an inactive material having few internal losses.

Other characteristics of the invention are disclosed in the following description given by way of non-limiting example.

Figure 3:
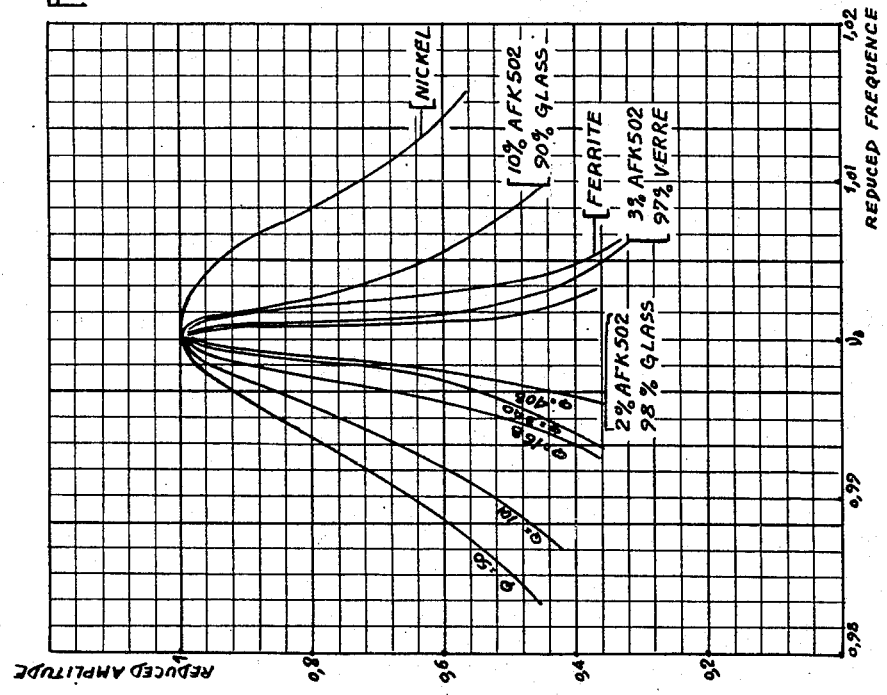
FIGS. 2 and 3 are diagrams showing characteristic curves of the transducer according to the invention with respect to those known in the art.
Figure 1:
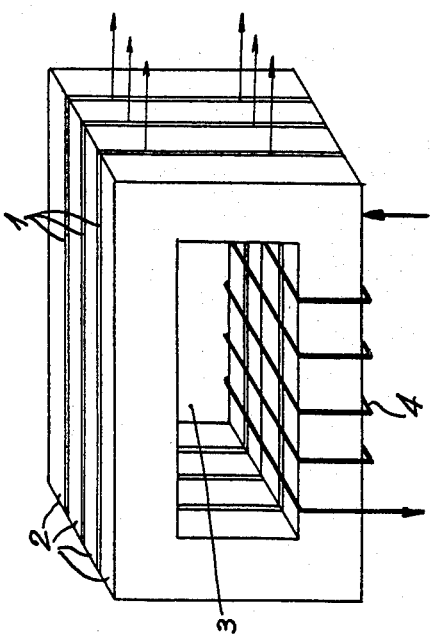
FIG. 1 is a perspective of a transducer according to the invention.

The magnetostrictive transducer according to the invention is constituted by a stack of thin plates 1 of a magnetostrictive material such as nickel, alternately disposed with thicker plates 2 of an "inactive" material, i.e., having no magnetostrictive properties such as glass. Each plate is provided with an opening 3, and the dimensions of said openings are the same for all plates. The dimensions of the plates of magnetostrictive and inactive materials respectively need not be identical.

The plates are piled so that each aperture 3 faces the next one. Interconnection between all of said plates is made by means of an adhesive or polymerizable resin. Such an interconnection may either also be made by direct deposit of nickel on glass by means of any process such as, for example electrolysis, or melted glass may be inserted between nickel plates then cooled. Thus, a piling up of elements is made in which the inactive material generally takes up a greater part in the total volume. The volume percentage of inactive material in the pile possibly mounts up to or even exceeds 95% of the total volume of the pile. A preferred embodiment of the invention consists of alternate 0.05 m./m. thick nickel plates 1, and 1 m./m. thick glass plates 2.

The scope of the present invention will not be departed from by substituting for nickel another magnetostrictive material, such as Fe-Ni or Fe-Co or Al-Fe alloys. For instance, another embodiment of the invention consists of alternate glass and permendur plates. "Permendur" is an alloy consisting of 49% Fe, 49% Co and 2% Va. The natural frequency is then well defined, and the resonance curve is particularly acute.

Selection of an inactive material like glass is adequate because internal frictions are particularly small therein. Besides, the sound velocity in glass is about that in nickel, and practically equal to that in permendur. This latter feature is particularly advantageous especially when resonant frequencies are needed which are the same as those supplied by a transducer of the same dimensions made entirely of nickel.

Moreover, the scope of the invention is likewise not departed from by substituting for glass another inactive material having few internal losses. For instance, as examples may be cited: enamel, porcelain, earthenware, quartz and sintered alumina. The magnetostrictive and inactive materials do not necessarily have equal acoustic specific impedances and if so required, both relative impedances may largely differ.

In a manner known per se, the transducer of the invention is subjected to the action of a magnetizing field from a winding 4 generating sound or ultrasonic wave which propagate in the plane of each magnetostrictive plate. The intermediary inactive plates, thus are vibrated as adjacently driven by magnetostrictive plates.

The advantages of a magnetostrictive transducer according to the invention are explained hereinafter. Vibrational amplitudes observed here are much greater than those obtained in piled plates of a magnetostrictive material such as for instance nickel or permendur, having no intermediary plates of an inactive material. The transducer also heats up much less. The magnetostrictive transducer is also remarkable for its strength, even when vibrations are very strong. A transducer of this type can produce strong ultrasonic beams in gas.

Figure 2:
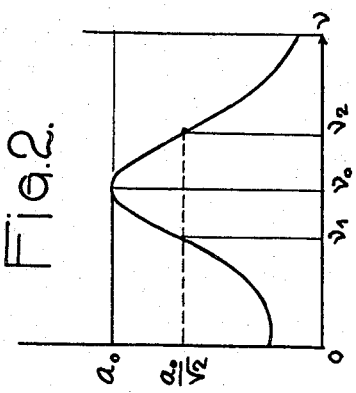

Advantages of the magnetostrictive transducer according to the invention over the actually known transducers are clearly viewable from consideration of characteristic curves shown in FIGS. 2 and 3.

In order to demonstrate better qualities of a transducer according to the invention, it has been found helpful to compare relative mechanical quality coefficient Q, also called "overvoltage coefficient," of various identically dimensioned transducers.

As it is known in the art coefficient Q is defined as follows:

With the energizing winding of the transducer supplied with a sine wave current of constant amplitude, sine wave frequency $\nu$ is varied while resulting vibrational amplitude $a$ generated in air is measured.

The characteristics $a=f(\nu)$ has a standard form similar to that of a resonant curve (FIG. 2):

$$\text{at resonance} \begin{vmatrix} \nu = \nu_0 \\ a = a_0 \end{vmatrix}$$

($a_0$ remaining at about the same value).

The bandwith $\nu_2 - \nu_1$ is by definition the frequency interval in which $$a \geq \frac{a_0}{\sqrt{2}}$$

Q then is defined as $$Q = \frac{\nu_0}{\nu_2 - \nu_1}.$$

FIG. 3 shows with respect to a reduced system of co-ordinates and for various magnetostrictive transducers having a natural frequency of about 21 kc. the curves $$\frac{a}{a_0} = f\left(\frac{\nu}{\nu_0}\right)$$

for which the following values of Q have been found:

| | Q |
|---|---|
| Oxidized and annealed pure nickel plates filed together | 50 |
| Piling up according to the invention comprising 10% of AFK 502 annealed with hydrogen (permendur 49% Fe-49% Co-2% Va.) and 90% of glass | 101 |
| Ferrite (trademark Philips) | 168 |
| Piling up according to the invention comprising 3% of AFK 502 annealed with hydrogen and 97% of glass | 340 |
| Piling up according to the invention comprising 2% of AFK 502 annealed with hydrogen and 98% of glass | 408 |

It is shown by such results the greater efficiency of the glass-metal transducers with respect to other known types of transducers.

What I claim is:

1. A magnetostrictive transducer comprising a set of relatively thin apertured plates of a magnetostrictive material and a set of apertured plates of non-magnetostrictive material having a thickness greater than that of said magnetostrictive plates, said plates of magnetostrictive and non-magnetostrictive materials being alternately disposed in a piled arrangement and connected rigidly together, and a magnetizing field producing element cooperative with said plates for producing the magnetostrictive effect thereby to generate and effect a wave propagation from said transducer.

2. A magnetostrictive transducer as defined in claim 1 and which further includes a thin layer of adhesive material between adjacent magnetostrictive and non-magnetostrictive plates for establishing said rigid connection therebetween.

3. A magnetostrictive transducer as defined in claim 1 wherein of the total volume represented by said piled arrangement of magnetostrictive and non-magnetostrictive plates, the volume of the non-magnetostrictive plates constitutes about 95% of the whole.

4. A magnetostrictive transducer as defined in claim 1 wherein said non-magnetostrictive plates are made from a material having a low internal loss factor.

5. A magnetostrictive transducer as defined in claim 1 wherein said non-magnetostrictive plates are made from a material taken from the group consisting of glass, enamel, porcelain, earthenware, quartz and sintered alumina, and wherein said magnetostrictive plates are made from a material taken from the group consisting of nickel and an alloy consisting of 49% iron, 49% cobalt and 2% vanadium.

6. A magnetostrictive transducer as defined in claim 1 wherein said plates of magnetostrictive and non-magnetostrictive material are coextensive in configuration.

7. A magnetostrictive transducer as defined in claim 1 wherein said magnetostrictive plates are made from nickel and wherein said non-magnetostrictive plates are made from glass, said nickel plates having a thickness of 0.05 mm. and said glass plates having a thickness 1.00 mm.

References Cited

UNITED STATES PATENTS

| | | | |
|---|---|---|---|
| 2,572,313 | 10/1951 | Burns | 310—26 |
| 2,619,604 | 11/1952 | Burns | 310—26 |
| 2,724,818 | 11/1955 | Camp | 340—9 |
| 3,174,130 | 3/1965 | Woollett | 310—26 XR |

MILTON O. HIRSHFIELD, *Primary Examiner.*

D. F. DUGGAN, *Assistant Examiner.*